United States Patent [19]

McLafferty et al.

[11] Patent Number: 4,910,287

[45] Date of Patent: Mar. 20, 1990

[54] 1-METHYL IMIDAZOLE CATALYZED CARBOXYL TERMINATED POLYESTER

[75] Inventors: John J. McLafferty, Hicksville; Sue L. Wang, Flushing, both of N.Y.

[73] Assignee: Ruco Polymer Corporation, Hicksville, N.Y.

[21] Appl. No.: 294,445

[22] Filed: Jan. 6, 1989

[51] Int. Cl.$^4$ ............................................. C08G 63/02
[52] U.S. Cl. ................................... 528/272; 528/296; 528/297; 528/302; 528/308; 528/308.6; 528/403; 525/437; 524/92; 524/93; 428/422.8; 428/458; 428/480
[58] Field of Search ............... 528/272, 296, 297, 302, 528/308, 308.6, 403; 525/437; 428/427.8, 458, 480; 524/92, 93

[56] References Cited

U.S. PATENT DOCUMENTS

| | | | |
|---|---|---|---|
| Re. 32,029 | 11/1985 | Pesata, Jr. et al. | 525/438 |
| 4,147,737 | 4/1979 | Sein et al. | 525/438 |
| 4,223,097 | 9/1980 | Johannes et al. | 525/107 |
| 4,356,285 | 10/1982 | Kumagai | 525/111 |
| 4,370,452 | 1/1983 | Heater | 525/438 |
| 4,804,581 | 2/1989 | Geary et al. | 428/332 |

Primary Examiner—John Kight
Assistant Examiner—Samuel A. Acquah
Attorney, Agent, or Firm—Robbins & Laramie

[57] ABSTRACT

The present disclosure is concerned with catalyzing the reactivity of carboxyl group bearing polyesters such as terephthalic acid, isophthalic acid, neophentyl glycol based polyesters which are suitable for use in powder coating formulations with epoxide compounds. An enhanced uniformity of catalysis is obtained without a degradation of color by adding 1-methyl imidazole to a liquid melt of the polyester. In a preferred embodiment between 0.03 and 0.3 weight percent of the 1-methyl imidazole is added to a molten polyester which has an acid number between 10 and 100, a 200° C. I.C.I. cone and plate viscosity between 20 and 70 Poise, and a DSC determined glass transition temperature of at least about 40° C. when the polyester is at a sufficiently elevated temperature to have I.C.I. plate and cone viscosity of less than about 70 Poise. A particularly advantageous powder coating composition results when such a polyester is combined with an at least difunctional epoxy compound such as triglycidyl isocyanurate (TGIC) at an epoxy to carboxyl ratio of between about 0.9 to 1.4 extrusion mixing.

34 Claims, No Drawings

1-METHYL IMIDAZOLE CATALYZED CARBOXYL TERMINATED POLYESTER

FIELD OF THE INVENTION

The present invention is concerned with low color carboxyl group bearing polyester resins which are suitable for use in formulating with epoxy compounds or other curatives to form thermosetting powder coatings.

BACKGROUND OF THE INVENTION

Powder coatings are a well known type of thermosetting coating and carboxyl group bearing polyesters are used to formulate a particular type of powder coating. In particular polyesters with a substantial content of carboxylic acid groups are typically formulated with epoxide compounds to yield powders which can be applied to various substrates by electrostatic spray or fluidized bed and then cured by baking. The cure or crosslinking to a thermoset solvent resistant state is the result of the reaction between the carboxyl groups and the epoxy groups.

The art has found it to be a practical necessity to include a curing catalyst in such polyester/epoxy compound compositions. The uncatalyzed rate of reaction has been found to be too slow to suit the baking schedules established in the industry. The alternatives available to the end user have forced the suppliers of polyester-epoxy based powder coatings to provide products which cure at rates competitive to these alternatives.

However, a difficulty has arisen in achieving a uniform distribution of the curing catalyst in the powder coating composition. The polyester component is typically manufactured by one supplier and the epoxy component is manufactured by another, although some manufacturers offer both components. In any case the powder paint formulator typically combines these ingredients and others, such as pigment and flow aids, in an extruder. The extruder is fairly efficient in achieving a uniform mixture of these ingredients. But the curing catalyst is typically employed in amounts of less than one weight percent, often less than 0.5 weight percent and it is difficult to obtain a good distribution of such a small amount of an ingredient in the typical compounding extruder, particularly when the catalyst is a liquid at the compounding temperature. At such low levels the liquid catalyst is unable to uniformly wet the particles of solid material.

A non-homogeneous distribution of cure catalyst may lead to localized high and low catalyst concentration regions even within a single coating batch thus giving inconsistent quality. High catalyst concentration can cause a premature curing reaction between the epoxy groups and the carboxyl groups during the extrusion compounding and thus result in gel formation. These gels can then cause defects in the finished coating. Over-catalyzed material is also subject to gel formation during extended storage of the powder coating composition thus undesirably limiting its shelf life. On the other hand, under-catalyzed material may fail to achieve an adequate state of cure to display the required properties under a given set of baking conditions.

The common compounding of uniformly incorporating a low level additive by preparing a master batch poses special difficulties for these curing catalysts. Because these catalysts have a tendency to chemically interact with either of the chemically active components (the carboxyl polyester and the epoxy compound) there is concern about degradation of the master batch with its high concentration of catalyst either during its preparation or its incorporation into the powder coating composition. This approach involves subjecting the high catalyst content master batch composition to two heat histories; the first one in preparing the master batch by combining a major ingredient with a high level of catalyst and the second one in diluting the catalyst concentration down to end use levels by compounding the master batch into the mixture of the remainder of the powder coating composition components.

There are also difficulties with adding the curing catalyst to a liquid melt of one of the major components. Incorporation into the epoxy component does not represent a realistic alternative to a supplier of the polyester component who does not also supply an epoxy component. Furthermore, a substantial portion of the market for carboxyl polyester powder coating components is in formulations involving a fairly low content of epoxy component. For instance there is a sub-market for carboxyl polyesters which are compounded with triglycidyl isocyanurate (TGIC), which has a fairly low epoxy equivalent weight. Such formulations involve polyester to TGIC weight blend ratios of around 14:1. Thus incorporating the catalyst into the TGIC would require high concentrations of catalyst raising similar problems to those involved with master batching.

The incorporation of the curing catalyst into a liquid melt of the carboxyl polyester component may cause discoloration of the polyester. At the molecular weights at which these polyesters find utility in powder coatings liquid melts are only achieved at temperatures in the range of 200° C. Furthermore, the common practice in the production of such resins is to transfer the liquid melt directly from the reaction vessel to a flaking belt on which it solidifies to form solid flakes. For a commercial size production vessel this process often takes five or more hours. Thus if a curing catalyst is to be incorporated into a liquid melt of the polyester it must be stable in the melt at temperatures in excess of 200° C. for times in excess of five hours. Unfortunately, a particularly interesting class of curing catalysts, the imidazoles, lacks optimum stability under these conditions and causes discoloration of the polyester.

Although some degree of discoloration can be tolerated in some applications it is undesirable in all cases. In some applications the powder coating composition is so highly pigmented that any discoloration of the composition would be effectively masked. However, there are other applications such as transparent coats in which it is unacceptable. Furthermore powder coating formulators have an aversion to purchasing a discolored raw material even if the discoloration can be masked.

It has now been found that a particular imidazole, 1-methyl imidazole, will display the requisite stability if the carboxyl terminated polyester is prepared in a special manner. A convenient technique for preparing such polyesters is to first prepare a hydroxyl terminated polyester and then react it with a carboxylic acid anhydride to achieve acid termination. Such an approach is taught in U.S. Pat. No. 4,147,737 to Sein et al. The 1-methyl imidazole will cause discoloration if added to a liquid melt of a carboxyl polyester prepared in such a manner. It is necessary to utilize carboxyl polyesters in whose synthesis such anhydrides did not play a significant role.

SUMMARY OF THE INVENTION

A low color or colorless carboxyl group bearing polyester suitable for use in formulating powder coatings and having a fairly uniform distribution of a curing catalyst is obtained by adding an effective amount of 1-methyl imidazole to the reactants used to form the polyester or to a liquid melt of the polyester. This polyester preferably has a differential scanning calorimetry (DSC) determined glass transition temperature of at least about 40° C. It is also preferred to add between about 0.03 and 0.3 weight percent of the 1-methyl imidazole to a melt which has an I.C.I. cone and plate determined viscosity of no more than about 70 Poise.

DETAILED DESCRIPTION OF THE INVENTION

The polyesters useful in the practice of the present invention are any of those suitable for the formulation of thermosetting powder coatings with epoxide group bearing compounds. This implies that the polyesters have a sufficiently high glass transition temperature to resist clumping when in powder form and subjected to normally encountered field conditions. It is preferred that the polyesters have a DSC determined glass transition temperatures of at least about 40° C. It is also required that the polyesters have low enough softening points to flow out to a uniform film when formulated with an epoxy curative and applied to a substrate under normal powder coating conditions. It is preferred that they have ring and ball softening points determined in accordance with ASTM Standard E28-58T of about 140° C. or less. Finally the polyesters should carry an appropriate number of carboxyl groups and have appropriate molecular weights to enable them to cure with appropriate epoxy curatives to yield a thermoset coating with acceptable properties without requiring an inordinate amount of the epoxide curative. It is preferred that they have acid numbers between about 10 and 100, more preferably between about 20 and 90 and most preferably between about 20 and 45. It is also preferred that they have 200° C. I.C.I. cone and plate viscometer determined viscosities between about 20 and 70 Poise. It is further preferred that they have hydroxyl numbers less than about 10 more preferably less than about 5.

These polyesters may be synthesized from any of the commonly known carboxylic acids and polyols. The requisite properties are most readily obtained from a combination of aromatic dicarboxylic acids and aliphatic diols.

The dicarboxylic acid portion of the polyester may be supplied by the free acid or its lower alkyl ester. Suitable esters are those whose alcohol portion has a higher vapor pressure than the diol which is to be incorporated into the polyester. If dialkyl esters are to be used the dimethyl esters are preferred. It is also preferred that the major portion of the acid component be comprised of an aromatic acid. Among the aromatic acids those of the phthalic acid family are particularly preferred. It is especially preferred that at least about 30 mol percent and most preferred that at least about 60 mol percent of the acid component be terephthalic acid.

It is preferred that a portion, more preferably at least about 4 mol percent, of the dicarboxylic acid reactant be readily soluble in the diol component and/or the forming polyester. In practical terms the solubility is determined by how readily the reaction mass clarifies after the addition of a given acid. Included among the suitable acids are adipic, glutaric, succinic, sebacic and isophthalic with isophthalic acid being particularly preferred.

The polyol component may be comprised of any hydrocarbon or substituted hydrocarbon which carries at least two primary or secondary hydroxyl groups and which is, with the exception of these hydroxyl groups, non-reactive under polyester formation conditions. The aliphatic and cycloaliphatic diols are preferred. It is particularly preferred to utilize at least a majority of lower alkyl diols. Included among the suitable diols are ethylene glycol, propane-1,2-diol, butane-1,2-diol, butane-1,4-diol, neopentyl glycol, hexane-2,5-diol, hexane-1,6-diol,2,2-[bis-(4-hydroxyhexyl)]propane, 1,4-dimethylol cyclohexane, diethylene glycol, dipropylene glycol and 2,2-bis-[4-(2-hydroxyethoxy)] phenylpropane. It is especially preferred to utilize at least about 50 mol percent neopentyl glycol and it is most preferred to use essentially all neopentyl glycol.

A small amount of a branching agent may be useful in enhancing the properties of the films formed from the polyester. It is preferred to use between about 0.2 and 4 mol percent based on the mols of carboxyl reactant. The branching agent may be any compound bearing three or more groups which participate in forming ester groups. However, it is preferred that the branching agent be a tri or higher functional hydroxyl bearing compound with the tri-functional compounds being particularly preferred. Included among the suitable branching agents are trimellitic anhydride, trimethylol propane, glycerin, hexanetriol, pentaerythritol, sorbitol, trimethylol ethane, triethylol propane and tris-(2-hydroxyethyl)-isocyanurate.

The polyester may be synthesized in accordance with established technology. In general this involves subjecting the reactants to elevated temperatures, preferably in the presence of an appropriate catalyst, and to vacuum after some initial reaction has occurred. The published techniques of first synthesizing a hydroxyl terminated polyester and then terminating it by reaction with additional carboxylic acid are suitable, so long as the additional carboxylic acid reactant is not added in the form of an anhydride. If such a technique is employed it is preferred to produce an intermediate having a hydroxyl number between about 20 and 190.

Alternatively, all the reactants can be added at the start of the reaction. In such a procedure, it is necessary to use a molar excess of carboxylic acid reactant. If the particularly preferred terephthalic acid forms a substantial portion of the carboxylic acid charge it is preferred to subject the reactants to vigorous agitation. Terephthalic acid is insoluble in the preferred diols, such as neopentyl glycol, and in the forming polyester. The agitation is believed to promote contact between the terephthalic acid and the other reactants. In any case this agitation does control the cloudiness encountered when using terephthalic acid in this type of synthesis.

The typical procedure involves charging the polyol reactants, heating until they are all molten and then charging the carboxylic acid reactants and the reaction catalyst. The reaction mass may then be heated to a temperature between about 180° and 240° C. and the esterification or transesterification products distilled off. If the carboxylic acid reactant is used as the free acid water will be the major distillate whereas if it is used as a dialkyl ester the corresponding alkanol will be the major distillate. The reaction is typically conducted until substantially all the polyol reactant has been consumed. If the reaction is to involve another addition of carboxylic acid this is a convenient point at which to make such an addition. A vacuum is then applied to force to reaction to the desired values of acid number and I.C.I. cone and plate viscosity. This portion of the reaction may also be conducted at between about 180° and 240° C. The vacuum and temperature should be balanced such that the excess reactant is distilled off as shorter polymer chains are joined. Vacuums between about 400 and 50 mm of mercury are convenient.

The synthesis may be promoted by any suitable catalyst. Catalysts which also have a beneficial effect of the reaction rate of epoxy groups with carboxyl groups are preferred. Included among the suitable catalysts are the organotin catalysts such as butylchloro tin dihydroxide and dibutyltin oxide. The catalyst may be used in any amount effective to promote the ester formation and not impair the attainment of the required molecular weight or adversely effect the properties of the polyester formed. It is preferred to use between of about 0.05 and 0.25 weight percent, based on the weight of reactants.

The 1-methyl imidazole may be added at any point during the synthesis from the initial charge until the discharge of the reaction vessel. It is only important that it be added while the reactants or the polyester are in the form of a liquid melt. The melt should have a low enough viscosity that the 1-methyl imidazole can be homogeneously distributed. It is preferred that the I.C.I. plate and cone determined viscosity be less than about 70 Poise. It is also preferred that the addition be made after the synthesis reaction has been completed. It is particularly preferred to add the 1-methyl imidazole to molten polyester which is at a temperature of about 215° C. or higher. It is especially preferred to add it after the addition of antioxidants and shortly before discharge of the polyester from the reaction vessel. It is particularly advantageous to minimize the time during the polyester containing 1-methyl imidazole is held at temperatures above about 200° C.

The 1-methyl imidazole may be added in any amount effective to catalyze the reaction of epoxy group with carboxyl groups under the conditions normally used to cure carboxyl terminated polyester/epoxy powder coating compositions. It is preferred to use between about 0.03 and 0.3 weight percent, based on the weight of polyester. It is particularly preferred to use between about 0.10 and 0.25 weight percent.

Antioxidants may also be added to the molten polyester. They are normally added after completion of the synthesis reaction. The phosphite based antioxidants are preferred. Included among the suitable phosphites are triphenylphosphite and distearyl pentaerythritol diphosphite. The phosphites may be used in any effective amount but it is preferred to use between about 0.30 and 0.90 weight percent, based on the weight of the resin.

The copolymers obtained in accordance with the present invention have low color or are essentially colorless. They have not suffered a substantial color degradation due to the presence of the 1-methyl imidazole epoxy curing catalyst in the molten copolyester. This is in contrast to other imidazole catalysts which cause a substantial yellowing of the polyester if present in the polyester when it is subjected to temperatures sufficient to render it molten (e.g. temperatures at which the I.C.I. cone and plate determined viscosity is about 70 Poise or less). This discoloration is conveniently measured by dissolving the polyester to be evaluated in N-methyl-2-pyrrolidone to prepare a 50% solution and then assessing the color against the Gardner-Holt color scale in accordance with ASTM Standard D1544-68. 1-methyl imidazole catalyzed polyesters which display a Gardner-Holt color number less than about 3 are preferred with those having numbers less than about 2 being particularly preferred.

The 1-methyl imidazole catalyzed polyesters of the present invention also have enhanced reactivity with epoxy group bearing compounds compared to uncatalyzed polyesters or polyesters containing non-imidazole catalysts. This reactivity may be conveniently assessed in terms of the development of mechanical properties after a particular baking cycle in a powder coating formulation. For instance the impact resistance in accordance with ASTM Standard D2794-84 (Gardner Impact Test) after baking for ten minutes at 205° C. (400° F.) in a formulation containing triglycidyl isocyanurate and pigment provides a useful index.

The catalyzed polyester resins of the present invention are useful in formulating powder coating compositions with polyepoxide compounds bearing at least two epoxy groups per molecule. A particularly preferred polyepoxide compound is triglycidyl isocyanurate. It is preferred to utilize between about 0.9 and 1.4 equivalents of epoxy groups per equivalent of polyester carboxyl groups and is particularly preferred to approach stoichiometry, i.e. one epoxy group per carboxyl group. These formulations may also contain pigment, such as titanium dioxide, and flow and leveling agents.

The 1-methyl imidazole catalyzed polyesters may be combined with the other ingredients of the powder coating composition in any manner known in the art. However, it is preferred to mix the ingredients at elevated temperatures with the application of substantial shear in accordance with well known compounding techniques. A particularly convenient technique is to mix the ingredients in an extruder. Naturally the compounding conditions should be mild enough that the curing reaction between the 1-methyl imidazole catalyzed carboxyl terminated polyester and the epoxide curative is not initiated.

The composition is then ground and sieved to obtain an appropriate particle size distribution. A free flowing powder with a particle size range between about 20 and 150 microns is preferred. The composition may be utilized in accordance with the established powder coating application techniques. It is particularly convenient to apply the composition by electrostatic spraying wherein the powder particles are given an electrical charge and the substrate is grounded. The coating may then be cured utilizing a bake cycle of between about 160° and 210° C. for between about 10 and 30 minutes.

COMPARISON EXAMPLE 1

Stage 1

Preparation of a Hydroxyl Terminated Prepolymer

The following example was conducted in a twelve liter flask equipped with a heating mantle, stirrer, thermometer and connected to a column packed with stainless steel saddles. The flask was charged:

| Terephthalic acid | 5845 gms | (35.2 moles) |
| Neopentyl glycol | 4268 gms | (41.0 moles) |
| Butylchloro tin dihydroxide | 8 gms | (.08 wt. %) |

This mixture of neopentyl glycol, terephthalic acid, and butylchloro tin dihydroxide esterification catalyst was heated to 240° C. Vacuum was started and slowly increased over a period of 6 hours to a level of 30 inches. The reaction was monitored by periodically measuring the acid number and the viscosity using an I.C.I. cone and plate viscometer. When a viscosity of 49 Poise at 175° C. and an acid number of 5.6 was obtained the resin was clear and this first stage was completed. The hydroxyl number of this prepolymer was found to be 46.9.

Stage 2

Preparation of a Carboxylic Acid Terminated Polyester

To a 2 liter flask equipped with a heating mantle, stirrer, thermometer and connected to a column packed with stainless steel saddles was charged:

| Stage 1 Prepolymer | 1500 gms |
|---|---|

This hydroxyl terminated stage 1 prepolymer was heated to a temperature of 200° C. At this temperature the following was added:

| Succinic anhydride | 107 gms (1.07 moles) |
|---|---|

The temperature was raised and held at 230° C. and vacuum was applied slowly over a 20 minute period until a vacuum of 20 inches was obtained. The reaction was monitored by periodically measuring the acid number and the 200° C. viscosity using an I.C.I. cone and plate viscometer. After an acid number of 39.2 and a 200° C. viscosity of 24 Poise were obtained the reaction mass was cooled to 220° C. At this temperature the following were added with agitation:

| Triphenylphosphite | 5.7 gms | (0.35 wt. %) |
|---|---|---|
| Distearyl pentaerythritol diphosphite | 2.3 gms | (0.14 wt. %) |

The above two antioxidants were mixed into the resin for 40 minutes. After this time the 1-methyl imidazole was added:

| 1-methyl imidazole | 2.3 gms (0.14 wt. %) |
|---|---|

The catalyst was mixed into the resin for 40 minutes. Immediately upon the addition of the catalyst a yellow color developed. This color darkened considerably during the 40 minute period the resin was held at the reactor discharge temperature of 220° C. The final resin was a brownish dark orange color.

EXAMPLE 1

Stage 1

A Portion of the Same Hydroxyl Terminated Prepolymer Prepared in Comparison Example 1 was Used in this Example Stage 2

Preparation of a Carboxylic Acid Terminated Polyester

To a 2 liter flask equipped with a heating mantle, stirrer, thermometer and connected to a column packed with stainless steel saddles was charged:

| Stage 1 Prepolymer | 1500 gms |
|---|---|

This hydroxyl terminated stage 1 prepolymer was heated to a temperature of 200° C. At this temperature the following was added:

| Succinic acid | 126 gms (1.07 moles) |
|---|---|

The temperature was raised and held at 230° C. and vacuum was applied slowly over a 20 minute period until a vacuum of 20 inches was obtained. The reaction was monitored by periodically measuring the acid number and the 200° C. viscosity using an I.C.I. cone and plate viscometer. After an acid number of 39.2 and a 200° C. viscosity of 24 Poise was obtained the reaction mass was cooled to 220° C. At this temperature the following were added with agitation:

| Triphenylphosphite | 5.7 gms | (0.35 wt. %) |
|---|---|---|
| Distearyl pentaerythritol diphosphite | 2.3 gms | (0.14 wt. %) |

The above two antioxidants were mixed into the resin for 40 minutes. After this time the 1-methyl imidazole was added:

| 1-methyl imidazole | 2.3 gms (0.14 wt. %) |
|---|---|

The catalyst was mixed into the resin for 40 minutes. After this time period the resin was discharged from the flask. The color of this resin was a light yellow and was significantly better than the color of the resin in Comparison Example 1.

EXAMPLE 2

Stage 1

Preparation of a Hydroxyl Terminated Prepolymer

The following example was conducted in a 2000 gallon reactor equipped with a heating jacket, temperature controller, agitator and a column packed with stainless steel saddles. To this reactor was charged:

| Terephthalic acid | 8093 pounds | (48.75 moles) |
|---|---|---|
| Isophthalic acid | 1250 pounds | (7.53 moles) |
| 90% Neopentyl glycol in water | 7168 pounds | (62.03 moles) |
| Trimethylol Propane | 36 pounds | (0.27 moles) |
| Butylchloro tin | 16 pounds | (0.09 wt. %) |

| | | |
|---|---|---|
| dihydroxide | | |

This mixture of neopentyl glycol, trimethylol propane, isophthalic acid, terephthalic acid, and butylchloro tin dihydroxide esterification catalyst was heated to 238° C. Vacuum was started and slowly increased over a period of 2 hours to a level of 400 mm Hg. The reaction was monitored by periodically measuring the acid number and the viscosity using an I.C.I. cone and plate viscometer. When a viscosity of 33 Poise at 175° C. and an acid number of 13.5 were obtained the resin was clear and this first stage was completed. The hydroxyl number of this prepolymer was found to be 46.6.

Stage 2

Preparation of a Carboxylic Acid Terminated Polyester

To this reactor was added:

| | | |
|---|---|---|
| Isophthalic acid | 1650 pounds | (9.94 moles) |

The temperature was raised and held at 240° C. and vacuum was applied slowly over a 7 hour period until a vacuum of 50 mm Hg. was obtained. This vacuum was maintained until the completion of this stage. The reaction was monitored by periodically measuring the acid number and the 200° C. viscosity using an I.C.I. cone and plate viscometer. After an acid number of 38.6 and a 200° C. viscosity of 51 Poise were obtained the reaction mass was cooled to 215° C. At this temperature the following were added with agitation:

| | | |
|---|---|---|
| Triphenylphosphite | 72 pounds | (0.47 wt. %) |
| Distearyl pentaerythritol diphosphite | 29 pounds | (0.19 wt. %) |

The above two antioxidants were mixed into the resin for 15 minutes. After this time the 1-methyl imidazole was added:

| | | |
|---|---|---|
| 1-methyl imidazole | 13 pounds | (0.085 wt. %) |

The catalyst was mixed into the resin for 15 minutes. After this time period delivery to a flaker belt was started. Five hours were required to empty the reactor of product. The resin prepared in this example was a very light yellow color. No significant increase in color occurred in the reactor during this 5 hour belting procedure. The resultant resin had an acid number of 36.4, a hydroxyl number of 3.9, a viscosity @200° C. (using an I.C.I. cone and plate viscometer) of 51 Poise, a glass transition temperature of 70° C. by DSC and a Gardner-Holt Color Number as a 50 weight percent solution in N-methyl-2-pyrrolidone of less than 1.

EXAMPLE 3

Stage 1

Preparation of a Hydroxyl Terminated Prepolymer

The following example was conducted in a 5 liter reactor equipped with a heating jacket, temperature controller, agitator and a column packed with stainless steel saddles. To this reactor was charged:

| | | |
|---|---|---|
| Terephthalic acid | 1213.5 gms | (7.31 moles) |
| Neopentyl glycol | 967.9 gms | (9.31 moles) |
| Trimethylol propane | 5.4 gms | (0.40 moles) |
| Butylchloro tin dihydroxide | 1.2 gms | (0.45 wt. %) |
| Dibutyltin oxide | 1.2 gms | (0.45 wt. %) |

This mixture of neopentyl glycol, trimethylol propane, terephthalic acid, butylchloro tin dihydroxide and dibutyltin oxide esterification catalysts was heated to 240° C. The reaction was monitored by periodically measuring the acid number and the viscosity using an I.C.I. cone and plate viscometer. When a viscosity of 5 Poise at 175° C. and an acid number of 6.0 was obtained the resin was clear and this first stage was completed. The hydroxyl number of this prepolymer was found to be 108.8.

Stage 2

Preparation of a Carboxylic Acid Terminated Polyester

To this reactor was added:

| | | |
|---|---|---|
| Isophthalic Acid | 435 grams | (2.62 moles) |

The temperature was raised and held at 240° C. and vacuum was applied slowly over a 1.5 hour period until a vacuum of 28 inches of Hg. was obtained. This vacuum was maintained until the completion of this stage. The reaction was monitored by periodically measuring the acid number and the 200° C. viscosity using an I.C.I. cone and plate viscometer. After an acid number of 36.1 and a 200° C. viscosity of 47 Poise were obtained the reaction mass was cooled to 220° C. At this temperature the following were added with agitation:

| | | |
|---|---|---|
| Triphenylphosphite | 13.1 gms | (0.60 wt. %) |
| Distearyl pentaerythritol diphosphite | 5.2 gms | (0.23 wt. %) |

The above two antioxidants were mixed into the resin for 10 minutes. After this time the 1-methyl imidazole was added:

| | | |
|---|---|---|
| 1-methyl imidazole | 2.6 gms (0.11 wt. %) | |

The catalyst was mixed into the resin for 5 minutes. After this time period the resin was discharged from the flask. The resin was essentially colorless.

EXAMPLE 4

A base stock of carboxy terminated resin was prepared and 1500 pounds were removed. This uncatalyzed portion of the batch was subsequently used in TGIC curing catalyst studies. The remainder of the batch was catalyzed with imidazole at a level of 0.1%. Two antioxidants were also added to the remainder of this batch. These antioxidants were triphenyl phosphite (0.4% was added) and distearyl pentaerythritol diphosphite (0.2% was added). Severe discoloration occurred during belting, i.e. while the resin was being transferred from the reaction vessel to a belt upon which it was solidified. This procedure consumed about five hours during which the resin in the vessel was held at about 210° C. The uncatalyzed portion of this batch was used for a discoloration resistance study and a curing behavior study. The formulation and the procedure employed to produce this batch is as follows:

Stage 1

Preparation of a Hydroxyl Terminated Prepolymer

The following example was conducted in a 2000 gallon reactor equipped with a heating jacket, temperature controller, agitator and a column packed with stainless steel saddles. To this reactor was charged:

| Terephthalic acid | 8093 pounds (48.75 moles) |
|---|---|
| Isophthalic acid | 1077 pounds (6.49 moles) |
| 90% Neopentyl glycol in water | 7168 pounds (62.03 moles) |
| Trimethylol propane | 36 pounds (0.27 moles) |
| Butylchloro tin dihydroxide | 16 pounds (0.09 wt. %) |

This mixture of neopentyl glycol, trimethylol propane, isophthalic acid, terephthalic acid, and butylchloro tin dihydroxide esterification catalyst was heated to 238° C. Vacuum was started and slowly increased over a period of 2 hours to a level of 400 mm Hg.. The reaction was monitored by periodically measuring the acid number and the viscosity using an I.C.I. cone and plate viscometer. When a viscosity of 34 Poise at 175° C. and an acid number of 7.6 was obtained this first stage was completed.

Stage 2

Preparation of a Carboxylic Acid Terminated Polyester

To this reactor was added:

| Isophthalic acid | 1622 pounds | (9.77 moles) |
|---|---|---|

The temperature was raised and held at 240° C. and vacuum was applied slowly over a 7 hour period until a vacuum of 50 mm Hg. was obtained. This vacuum was maintained until the completion of this stage. The reaction was monitored by periodically measuring the acid number and the 200° C. viscosity using an I.C.I. cone and plate viscometer. After an acid number of 33.4 and a 200° C. viscosity of 53 Poise was obtained the reaction mass was cooled to 215° C. The resin was discharged from the reactor at this point; no catalysts or antioxidants were added. The resultant resin had an acid number of 33.4, a hydroxyl number of 4.7, a viscosity @200° C. (using an I.C.I. cone and plate viscometer) of 53 Poise and a glass transition temperature of 70° C. by DSC.

Discoloration Evaluation

The following procedure was used to evaluate discoloration:

One hundred and fifty grams of the above uncatalyzed resin was added to each of eight 8 oz. jars. To each jar was also added 0.53 grams (0.35 wt. %) of triphenyl phosphite and 0.23 grams (0.15 wt. %) of distearyl pentaerythritol diphosphite. To each of seven of the jars was added 0.3 grams (0.2 wt. %) of imidazole or a substituted imidazole. One jar received no addition of an imidazole or derivative. Two additional jars of resin were also prepared. These jars contained the resins of Comparison Example 1 and Example 1. The former resin was capped with succinic anhydride, the latter with succinic acid. Both contained the two antioxidants so none was added. Both also contained 1-methyl imidazole. The jars were purged with nitrogen and placed in a 200° C. oven for a period of four hours, approximately the time necessary to discharge a batch from a production sized vessel. After this time period the jars were individually removed from the oven and cast unto aluminum trays. After cooling each sample was ground and dissolved in N-methyl-2-pyrrolidone at a concentration of 50% by weight. After these samples were dissolved the color of each was measured via comparison to Gardner-Holt color standards in accordance with ASTM Standard D1544-68. The results were as follows:

| Imidazole Type | Color Number |
|---|---|
| Imidazole | 12 |
| 2-Methyl imidazole | 4 |
| 2-Phenyl imidazole | 3 |
| 1,2 Dimethyl imidazole | 3 |
| 1 Vinyl imidazole | 5 |
| N—(3 aminopropyl) Imidazole | 7 |
| 1-Methyl Imidazole | 1 |
| No catalyst | <1 |
| 1-Methyl imidazole in succinic anhydride capped resin of Comparison Example 1 | 4 |
| 1-Methyl imidazole in succinic acid capped resin of Example 1 | 1 | the above data clearly shows the unexpected superiority of 1-methyl imidazole in acid capped resins. It also shows the color development when 1-methyl imidazole is added to an anhydride capped resin.

Curing the Effectiveness Evaluation

The effectiveness of various epoxy catalysts including 1-methyl imidazole was evaluated in a fully formulated and cured powder coating. The study used the uncatalyzed resin used in the color development experiment. Samples of this resin were heated to 200° C. (at which temperature the I.C.I. plate and cone viscosity was less than 70 Poise) and then mixed with various levels of the epoxy catalysts. These resins were then evaluated in a full formula powder coating paint. The levels of catalyst and their type are tabulated below:

| Catalyst Type | Level, % Based on Resin |
|---|---|
| Triphenylphosphine | 0.20% |
| 1-Methyl imidazole | 0.15% |
| Imidazole | 0.15% |
| Benzyl trimethyl ammoniumchloride | 0.40% |

The above resin/catalyst blends were melt mixed through an extruder with the following other ingredients:

| Resin | 54.4 parts |
|---|---|
| TGIC (triglycidyl isocyanurate) | 4.1 parts |
| Benzoin | 0.5 parts |
| Acrylate flow agent | 1.0 parts |
| Titanium dioxide | 40.0 parts |

The extrudate was pulverized, sifted to obtain particles of less than 100 mesh and electrostatically applied to treated steel panels. These panels were baked for 10 minutes at 205° C. The panels were evaluated for their impact resistance. The results are as follows:

| GARDNER IMPACT RESISTANC (IN INCH POUNDS) ACCORDING TO ASTM D2794-84 | | |
| --- | --- | --- |
| Catalyst Type | Direct | Reverse |
| Triphenylphosphine | 20 | <5 |
| 1-methyl imidazole | 160 | 160 |
| Imidazole | 140 | 120 |
| Benzyl trimethyl ammonium-chloride | 100 | 80 |

What is claimed is:

1. A low color or colorless polyester resin composition suitable for formulation with a polyepoxide compound to form a powder coating composition comprising:
 a carboxyl group bearing polyester having a DSC determined glass transition temperature of at least about 40° C. which contains between about 0.03 and 0.3 weight percent of 1-methyl imidazole which was homogeneously distributed in a liquid melt of the polyester.

2. The composition of claim 1 wherein the 1-methyl imidazole was added to a melt of the polyester having an I.C.I. cone and plate determined viscosity of less than about 70 Poise.

3. The composition of claim 1 wherein the polyester has an acid number between about 10 and 100.

4. The composition of claim 1 wherein the polyester has a 200° C. I.C.I. cone and plate viscometer determined viscosity of between about 20 and 70 Poise.

5. The composition of claim 1 wherein the polyester has a ring and ball determined softening point of about 140° C. or less.

6. The composition of claim 1 wherein the polyester has a DSC determined glass transition temperature of at least about 45° C.

7. The composition of claim 1 which has a Gardner-Holt Color Number as a 50% solution in N-methyl-2-pyrrolidone of less than about 3.

8. The composition of claim 1 wherein the polyester resin also contains between about 0.05 and 0.25 weight percent of a polyesterification catalyst selected from the group consisting of butylchloro tin dihydroxide, dibutyltin oxide and mixtures thereof.

9. A polyester resin composition which is suitable for formulation with a polyepoxide compound to form a powder coating composition and which is light colored or colorless comprising
 a carboxyl group bearing a polyester resin having the following characteristics:
 (a) a DSC determined glass transition temperature of at least about 45° C.,
 (b) an acid number between about 20 and 90,
 (c) a 200° C. I.C.I. cone and plate viscometer determined viscosity between about 20 and 70 Poise,
 (d) a ring and ball determined softening point of to about 140° C. or less, and
 (e) a content of 1-methyl imidazole between about 0.03 and 0.3 weight percent,
 wherein said 1-methyl imidazole was added to said polyester or its precursors while they were in a liquid state.

10. The composition of claim 9 wherein the precursors of said polyester did not include a significant amount of carboxylic acid anhydrides.

11. The composition of claim 10 wherein the manner of addition of the 1-methyl imidazole was such as to homogeneously distribute it in said polyester.

12. The composition of claim 11 wherein said polyester has a hydroxyl number of about ten or less.

13. The composition of claim 12 wherein at least about 60 mol percent of the carboxylic acid residues of said polyester are derivatives of terephthalic acid.

14. The composition of claim 9 wherein said polyester is substantially terminated with isophthalic acid.

15. The composition of claim 13 wherein said polyester is substantially terminated with isophthalic acid.

16. The composition of claim 15 wherein the diol residues of said polyester are mainly derived from aliphatic diols.

17. The composition of claim 16 wherein the diol residues comprise derivatives of a diol selected from the group consisting of ethylene glycol, hexane diol, propylene glycol, 1,4-butane diol, cyclohexane dimethanol, neopentyl glycol and mixtures thereof.

18. The composition of claim 13 wherein the acid residues which are not derivatives of terephthalic acid are derivatives of an acid selected from the group consisting of isophthalic acid, glutaric acid, succinic acid, adipic acid, sebacic acid and mixtures thereof.

19. The composition of claim 13 wherein said polyester is mainly terminated by the residues of an acid selected form the group consisting of isophthalic acid, glutaric acid, succinic acid, adipic acid, sebacic acid and mixtures thereof.

20. The composition of claim 3 wherein the polyester has an acid number between about 20 and 45.

21. A powder coating composition comprising a mixture
 (a) a low molecular weight polyepoxide compound which has an average of at least about 2 epoxy groups per molecule, and
 (b) a polyester resin composition which is light colored or colorless comprising a carboxyl terminated polyester which has
  (i) a DSC determined glass transition temperature of about 40° C. or greater,
  (ii) a 200° C. I.C.I. plate and cone viscometer determined viscosity of about 70 Poise or less,
  (iii) an acid number of between about 20 and 45, and
  (iv) a content of 1-methyl imidazole of between about 0.03 and 0.3 weight percent which was obtained by addition of the 1-methyl imidazole to a liquid melt of the polyester.

22. The composition of claim 21 wherein
 (a) the 1-methyl imidazole was added to a melt of the polyester having an I.C.I. cone and plate determined viscosity of about 70 Poise or less, and
 (b) the 1-methyl imidazole containing polyester has a Gardner-Holt Color Number as a 50% solution in N-methyl-2-pyrrolidone of less than about 3.

23. The composition of claim 22 in which there are between about 0.9 and 1.4 equivalents of epoxy groups per equivalent of polyester carboxyl groups.

24. The composition of claim 23 wherein the polyepoxide compound comprises triglycidyl isocyanurate.

25. The composition of claim 24 wherein the polyester contains between about 0.05 and 0.25 weight percent of a polyesterification catalyst selected from the group consisting of butylchloro tin di-hydroxide and dibutyltin oxide.

26. A process for the preparation of catalyzed low color carboxyl group bearing polyesters suitable for formulation with polyepoxide compounds to form a powder coating composition comprising
  (a) condensing hydroxyl terminated polyesters from dicarboxylic acids, aliphatic diols and optional branching agents to have a hydroxyl number of between about 20 and 190 wherein at least about 60 mol percent of the acid is terephthalic acid and at least about 4 mol percent of a dicarboxylic acid which is soluble in the aliphatic diols,
  (b) reacting the hydroxyl terminated polyester with a dicarboxylic acid which is soluble in said polyester to yield a carboxyl group bearing polyester having
    (i) an acid number between about 10 and 100,
    (ii) a DSC determined glass transition temperature of 40° C. or higher,
    (iii) a 200° C. I.C.I. plate and cone determined viscosity of between about 20 and 70 Poise, and
    (iv) a hydroxyl number of about 10 or lower,
  (c) avoiding the use of any significant amount of carboxylic acid anhydride in the synthesis, and
  (d) adding between about 0.03 and 0.3 weight percent of 1-methyl imidazole to a liquid melt of said carboxyl group bearing polyester having an I.C.I. cone and plate viscosity of about 70 Poise or less.

27. The process of claim 26 wherein between about 0.05 and 0.25 of a polyesterification catalyst selected from the group consisting of butylchloro tin dihydroxide and dibutyltin oxide is used to promote the esterification reactions.

28. The process of claim 27 wherein the 1-methyl imidazole is added to a melt of said carboxyl group bearing polyester which is at a temperature of about 215° C. or higher.

29. The process of claim 26 wherein the diol soluble dicarboxylic acid comprises isophthalic acid.

30. The process of claim 26 wherein the polyester soluble dicarboxylic acid comprises isophthalic acid.

31. The process of claim 26 wherein the polyester forming reactants also include between about 0.2 and 4 mol percent of a branching agent based on the mols of dicarboxylic acid.

32. The process of claim 31 wherein the branching agent is a tri- or tetra- functional polyol.

33. The process of claim 32 wherein the polyol is trimethylol propane.

34. A process for the preparation of catalyzed low color carboxyl group bearing polyesters suitable for formulation with polyepoxide compounds to form a powder coat composition comprising:
  (a) utilizing reactants which include
    (i) dicarboxylic acids and their lower alkyl esters at least about 60 mol percent of which are terephthalic acid or its lower alkyl esters,
    (ii) aliphatic diols,
    (iii) optional branching agent, and
    (iv) no significant amount carboxylic acid anhydride,
  (b) utilizing heat, vacuum and catalysis to yield a polyester having
    (i) an acid number between about 10 and 100,
    (ii) a DSC determined glass transition temperature of about 40° C. or higher,
    (iii) a 200° C. I.C.I. plate and cone determined viscosity of between about 20 and 70 Poise, and
    (iv) a hydroxyl number of about 10 or lower, and
  (c) adding between about 0.03 and 0.3 weight percent, based on the weight of the final polyester, of 1-methyl imidazole to the reactants or to a melt of the polyester having an I.C.I. cone and plate determined viscosity of about 70 Poise or less.

* * * * *